Oct. 23, 1956     O. S. POKORNY ET AL     2,768,071

LIQUID-LIQUID CONTACTING APPARATUS

Filed May 19, 1953     3 Sheets-Sheet 1

OLDRICH S. POKORNY    INVENTORS
MICHAEL H. FARMER

BY /s/ ATTORNEY

Oct. 23, 1956   O. S. POKORNY ET AL   2,768,071
LIQUID-LIQUID CONTACTING APPARATUS
Filed May 19, 1953   3 Sheets-Sheet 3

OLDRICH S. POKORNY   INVENTORS
MICHAEL H. FARMER
BY /s/ Edwin M. Thomas   ATTORNEY United States Patent Office 2,768,071
Patented Oct. 23, 1956

2,768,071
LIQUID-LIQUID CONTACTING APPARATUS

Oldrich S. Pokorny and Michael H. Farmer, Sarnia, Ontario, Canada, assignors to Esso Research and Engineering Company, a corporation of Delaware Application May 19, 1953, Serial No. 355,956

10 Claims. (Cl. 23—270.5)

The present invention relates to a liquid-liquid contacting process and apparatus. More specifically, the invention pertains to a process and an apparatus for contacting together two liquids of different specific gravities, the less dense liquid being introduced at the bottom to flow upward and the more dense liquid being introduced at the top. Under such operating conditions the energy required for mixing is derived entirely or primarily from the gravity differential between the two liquids.

A specific application of the apparatus and process of this invention refers to the solvent extraction of lubricating oils, and the like, wherein a solvent of higher specific gravity than the oils, e. g. mineral hydrocarbon oils, is used to remove certain soluble ingredients in the lubricating oil. For example, certain mineral lubricating oil compounds such as Mid-Continent stocks and other non-paraffinic oils contain substantial portions of aromatic and other cyclic ingredients which tend to depress the viscosity index of the lubricating oil. Such oils tend also to be unstable at high temperatures, forming oil-insoluble sludge under some conditions. These oils can be considerably improved by removing the objectionable ingredients by solvent extraction. Certain selective solvents such as phenol, furfural, etc. have the property of dissolving the aromatic constituents when intimately contacted with the oil. These solvents, which are of higher specific gravity than mineral lubricating oils, settle downwardly carrying the objectionable aromatic and related ingredients with them. The raffinate oil gravitates upwardly and is eventually removed for use or for further processing as desired.

Hence, the invention will be described largely by reference to a typical phenol extraction process for treating lubricating oil fractions, but it will be understood that the invention is applicable to other processes where intimate mixing of two different liquids and subsequent separation by gravity are involved.

It will be understood that all references hereinafter to oil will include the oil phase generically, i. e. oil containing some dissolved or entrained solvent (e. g. phenol). Likewise reference to solvent or to phenol will be understood to include the solvent or phenol phase, i. e. solvent such as phenol containing dissolved or entrained oil. Aqueous phenol, which is commonly introduced in conventional extracting processes, is also included in the solvent or phenol phase.

The invention also has application to other liquid-liquid contacting applications. For example, in the pharmaceutical and chemical industries, it is often desirable to extract a certain desired component from aqueous solution by means of a solvent that is lighter than water. The type of contacting apparatus described in connection with this invention is also suitable for contacting a relatively heavier or denser solution with a lighter solvent. However, extraction processes are most efficient when the material to be extracted constitutes a discontinuous phase. Hence, the contracting apparatus arrangements described herein should, for the best operation of equipment, be arranged upside down. Consequently, the reversal of the plate arrangement involving the cascade flow with periods of intimate mixing of two different liquids is to be included as being within the skill of those familiar with the art.

In the prior art, numerous types of contacting apparatus have been known. In some of these a tower in the form of a vertical cylindrical vessel or equivalent is provided with a series of transverse plates or partitions, and the two liquids to be contacted are introduced respectively at the top and bottom, the denser liquid material going in at the top. The transverse partitions or plates are so arranged that the descending liquid flows over each plate, and downwardly to the next lower plate in cascade fashion. At the same time, the less dense liquid rises upwardly against the bottom of each plate and flows counter-currently to the descending liquid. The plates are so arranged as to cause as intimate a mixing of the liquids as is practicable. A particular object of the present invention is to improve the intimacy of mixing without substantially reducing the free separation of the two liquids after they have contacted together.

A further object of the invention is to avoid the excessive entrainment of one liquid in the other, after sufficient contacting has been effected to carry out the desired function.

Other objects and advantages of the invention will become more apparent as this description proceeds. Hence, reference will next be made to the annexed drawings which form a part of this observation.

Figure 1:
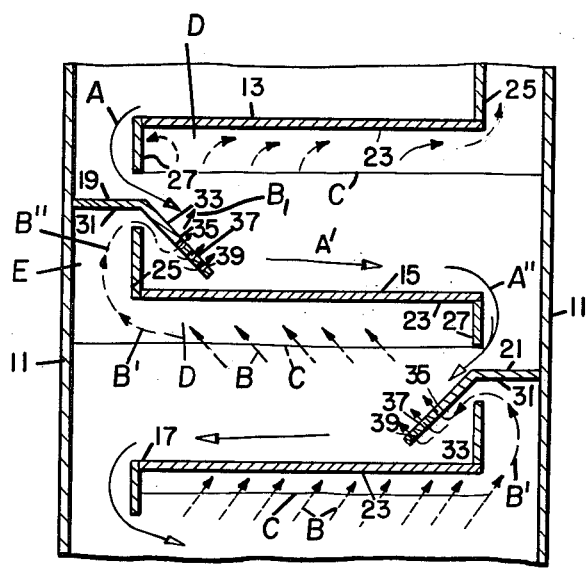
Fig. 1 shows diagrammatically a vertical section of one form of apparatus embodying certain features of the present invention.

Referring now to Fig. 1, there is shown a vertical vessel having outer side walls 11, preferably in the form of a right circular cylinder with a vertical axis. Within the vessel 11 are a series of transverse plates 13, 15, and 17, and flow control plates or deflectors 19 and 21. It will be understood that a relatively large number of the transverse plates and deflector plates would be used in a complete tower. For example, it will usually be found desirable to use from 8 to 20 or more of each. For solvent extraction of lubricating oils it is preferable to use from about 10 to 18 or more of these plates, and a similar number of deflectors or flow controllers.

Each of the transverse plates such as 13, 15, etc. has a horizontal portion extending across a major part of the transverse section of the vessel 11. This is indicated at 23. It will be understood that the horizontal portion is secured at its edges around its periphery to the vessel walls by suitable welding, riveting, or other conventional fastening means. Near one side, however, the plate is formed with an upturned lip or weir forming portion 25, which extends upwardly a few inches and at its other side, the plate is turned down as indicated at 27 to form an underflow weir.

Beneath each downturned lip or weir 27, and above each upturned lip or overflow weir 25, one of the deflector or flow-controlling plates 19 is located. These plates are preferably segmental in shape. Each of them consists of a horizontal portion 30 welded, riveted, or bolted to the wall of vessel 11. The inner part of each plate 19 is bent downwardly at an angle of about 20 to 60°, preferably in the neighborhood of 45°, to form a flow-deflecting portion 33. A vent opening 32 may be provided to permit escape of entrapped air or gas under the horizontal part of plates 19, 21, etc. The lower part of the downwardly deflected portion 33 is provided with a series of openings or rows of openings 35, 37, and 39. These are preferably arranged in horizontal rows. In Fig. 1, three rows of such openings are shown, but it will be understood that this number can be varied as desired.

The operation of the apparatus so far described will now be explained. Assuming that a liquid of relatively low density such as a lubricating oil fraction has been introduced at the bottom, and a liquid of higher density such as phenol at the top, the phenol begins immediately to settle downwardly following the general path indicated by the solid arrows A, A', A". At the same time the lubricating oil begins to rise against the bottom of each of the plates 13, 15, 17, etc., as indicated by the dotted arrows B, B', etc. The result of this action is that a layer of oil (or the less dense liquid in other processes) accumulates against the bottom of each of the horizontal plate sections 23. The depth of this layer will vary somewhat with the size of the apparatus, as the relative density of the two liquids varies, but an interface between the two liquid phases is established as indicated roughly by the wavy line C below each plate.

Considering plate 15, for example, a layer of oil D is shown as having accumulated below the horizontal section of plate 15. The descending stream of phenol as indicated by arrows A' and A" tends to force this layer of oil to flow upwardly around the left end of plate 15, as indicated by arrows B'. The oil fills the space E beneath deflector plate 19, and between the wall 11 and upturned flange 25 of plate 15. Finally the oil overflows this flange, which thus operates as an overflow weir, the flow being directed downwardly by the slanting under surface of the portion 33 of the deflector 19. When the oil reaches the first row of perforations 35 in this slanted portion, it flows upwardly and through the perforations in small jetlike streamlets, as indicated by the small arrows $B_1$. These jets of oil are approximately normal to the planes of surfaces 33. The first row of openings 35 is located below the top edge of flange 25. In effect, a hydraulic trap or seal is thus formed so that the phenol is substantially prevented from flowing countercurrently under deflector 19, 33, and over the flange or weir 25.

If the ascending oil stream flowing over weir 25 becomes too great in volume to pass through the first row of openings 35 in the plate 19, 33, the hydrostatic pressure will increase until the oil is forced down to the next row of openings 37, from which it can also escape by upward flow in jets or streamlets. If the two rows of perforations are still inadequate, the flow may reach the third row 39, etc. Hence, under varying conditions of flow a seal or trap will always be maintained which prevents counter-current flow of phenol through the passage beneath the deflector plate 19, 33, that is, the oil is prevented from bypassing the dispersion assembly. The streams of oil which flow upwardly through the openings 35, 37, etc. are intercepted at approximately a right angle by the down-flowing phenol to insure intimate mixing or contacting. Since this procedure is repeated at each stage, that is at each plate 19, 33, there will be intimate contacting of oil and phenol for as many stages as there are plates. However, it may be desirable in some cases to feed part of the oil in above one or more of the plates at the bottom of the vessel to provide for better phenol and oil separation at the bottom or likewise the phenol may be introduced below one or two or more plates at the top of the vessel to provide for better clear oil separation at the top. See Fig. 7 described below. The capacity of the extraction tower may be increased by this means.

The effect of the sloping perforated deflector portions 33 in combination with the phenol overflow weirs provided by upturned flanges 25 is to increase the efficiency of oil and phenol separation while at the same time promoting efficient liquid-liquid contacting.

In comparison with prior art apparatus where a phenol treat of 180 to 200%, based on the volume of oil was required, the present apparatus has reduced phenol requirements to between about 150 and 175%. This means an improvement of about 10 to 20% in efficiency. This results in increasing overall capacity and reducing requirements for phenol and for phenol recovery capacity.

Figure 2:
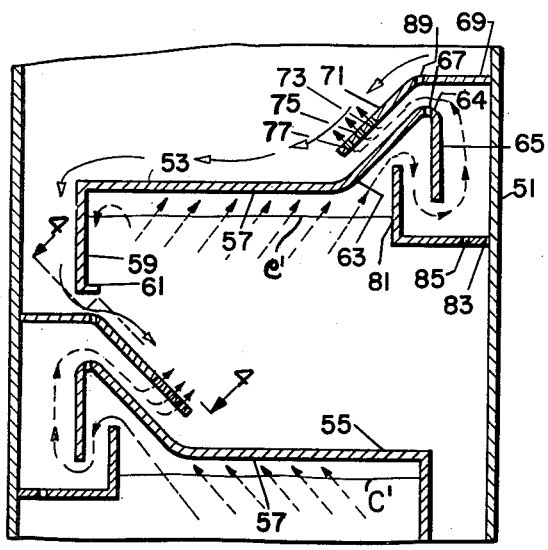
Fig. 2 is another vertical section of an apparatus embodying the features of Fig. 1 and some additional novel features.

Referring now to Fig. 2, there is shown another modification wherein a vessel 51 serves as a vertical tower in which a series of transverse plates 53, 55, etc. are located, much as in Fig. 1. Each of the transverse plates 53 and 55 has a horizontal portion 57 and a downturned flange 59 forming an underflow weir. The flange 59 also has an inturned toe or lip portion 61 for a purpose which will be described below. At its opposite margin each plate 53 or 55 is deflected upwards at an angle as indicated at 63, the margin being turned down as indicated at 65 to provide an overflow weir at the top and an underflow weir at the bottom edge. A small perforation or a plurality of such is provided at or near the bend which joins parts 63 and 65 for the purpose of releasing entrapped air thereunder as the vessel 51 is being filled. This opening (or plural openings) is not large enough to substantially affect liquid flow or liquid-liquid contact. Ordinarily the opening or vent would comprise only a fraction of 1% of the plate area.

Figure 4:
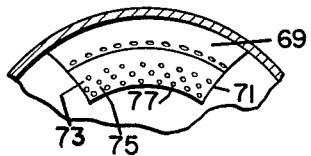
Fig. 4 is a detailed plan view of an element of the invention taken substantially along the line 4—4 of Fig. 2, and looking in the direction of the arrows.

A deflector plate 69 which is similar in all respects to plate 19 as a sloping skirt portion 71 provided with rows of perforations 73 corresponding to parts 33, 35 of Fig. 1. Additional rows of openings 75 and 77 are provided and may be of increasing size as indicated in Fig. 4 to give greater flexibility to the apparatus. The slopes of portions 63 and 71 are preferably similar so that these parts are approximately parallel.

The general operation of the apparatus of Fig. 2 is much the same as that of Fig. 1. However, it is found that in some cases the upward flow of oil as indicated by the dotted arrows B' of Fig. 1 is sufficiently strong that it entrains phenol below the interface C. A similar interface is shown at C' in Fig. 2, and an additional overflow weir or deflector 81 is provided in Fig. 2. As shown in this figure, the upstanding weir element of deflector 81 is part of a plate having a horizontal portion 83 secured to the wall of the vessel 51. A small weep or drain hole 85 is provided in the horizontal portion of the plate or deflector to release entrapped liquid when the tower is drained. The upper edge of the overflow deflector or weir 81 is located higher than the lower edge of the underflow weir 65, which was mentioned above.

In the apparatus of Fig. 2, an oil layer accumulates below each plate, e. g. plates 53, 55, to establish an oil-phenol interface indicated at C'. Pressure from the phenol causes this oil layer to flow up over weir 81 and then under the weir 65 as indicated by the dotted arrows. From here the oil flows up over the bend 64 between 63 and 65, this bend constituting an overflow weir. From thence the oil flows in a path sloping downwardly and then it flows upwardly in streamlets through the openings 73. Here the emerging oil streamlets are encountered more or less at right angles by the downflowing phenol to effect a thorough mixture. The small opening or openings 67 allows trapped air or gas, if any, to escape when the apparatus is being filled.

Ordinarily, the sweep of the stream of oil flowing beneath sloping plate 67 is enough to carry out the air or gas entrapped under the horizontal part of plate 69 down to the openings 73. However, it is desirable to provide an outlet 89 in or near the horizontal part 69 for escape of this entrained air or gas. This opening should not be large enough to substantially affect the flow of phenol and oil described above. The total area of such opening (or plural openings) would be only a fraction of 1% of the total open area provided for upflow or downflow of the liquids.

It will be understood that the purpose of the weir 81 is to prevent substantial entrainment of phenol in the oil which flows up over the weir 65. When plate 81, 83 is omitted, as in Fig. 1, there is likely to be phenol entrainment in the upflowing oil unless the flow rates are reduced to permit maintaining a substantial depth of oil below each plate. The system of Fig. 2 affords better insurance against such entrainment with varying rates of flow.

The effectiveness of this structure as compared with that of Fig. 1 is emphasized in the following data:

TABLE I

*Effect of oil sealing device on reducing upward entrainment of phenol with oil*

| Laboratory Scale Run No. | Without Seal | | | | | | | With Seal | | | |
|---|---|---|---|---|---|---|---|---|---|---|---|
| | 1 | 2 | 3 | 4 | 5 | 6 | 7 | 13* | 14* | 15 | 16 |
| Oil Feed | (1) | (1) | (1) | (2) | (2) | (1) | (1) | (3) | (3) | (2) | (2) |
| Vol. percent Entrainment in Riser Sample | 45 | 50 | 45 | 46 | 44 | 50 | 48 | 35 | 40 | 5 | 5 |
| Oil Rate, B./H. | 1.12 | 1.12 | 1.12 | 0.90 | 0.90 | 1.05 | 1.31 | 2.37 | 2.37 | 0.90 | 0.90 |
| Phenol Rate, B./H. | 1.54 | 0.80 | 2.05 | 1.97 | 1.97 | 2.05 | 2.05 | 2.64 | 2.64 | 1.99 | 1.99 |
| Tower Equivalent: | | | | | | | | | | | |
| Total Oil Rate, B./H. | 219 | 219 | 219 | 210 | 210 | 195 | 244 | 440 | 440 | 215 | 215 |
| Treat, Vol. percent | 145 | 76 | 193 | 194 | 194 | 217 | 155 | 124 | 124 | 191 | 191 |

(1) Redwater 30X Base (55 V. I.).
(2) Redwater 30 Base (85 V. I.)/Redwater 30X Base Blend.
(3) Tia Juana 125/140 LCT Distillate.
*Note.—Runs 13 and 14 were not entirely satisfactory because the LCT distillate was contaminated. The oil charge rate was double that normally used, hence the entrainments in the other samples cannot be directly compared. Phenol was added to the oil feed for partial presaturation in Runs 1-5 and 15-16.

In the description of Fig. 1 above, it was indicated that phenol flows downwardly under the downturned flanges or underflow weirs 27. Occasionally, in the apparatus of Fig. 1, the oil layer D may flow upwardly under the weirs 27 in counterflow to the main descending stream of phenol. This is due to formation of eddy currents under the horizontal plate above. Photographs have been obtained showing such occurrences under some operating conditions. It is desirable to prevent such action under all operating conditions and this is accomplished quite effectively by having the inturned lip or toe portion 61 at the bottom of the underflow weir 59 of Fig. 2. There is always some eddying of the oil, but the inturned lip 61 deflects it away from the underflow weir so that it effectively prevents counter-flowing of oil above the descending phenol stream.

Figure 3:
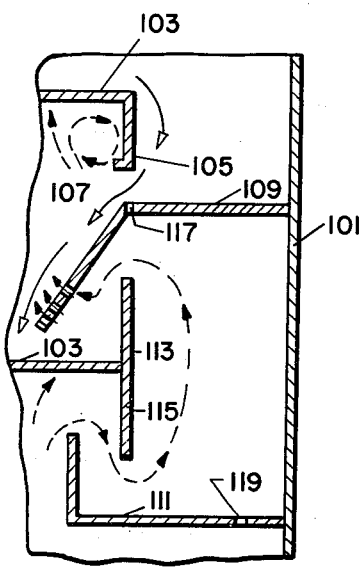
Fig. 3 is a detailed vertical sectional view on a larger scale, of a further modification.

Referring to Fig. 3, there is shown fragmentarily a system which is quite similar to that of Fig. 2 but with some modifications. In this case the vessel wall 101 and the plates 103 are generally similar to the arrangement of Fig. 2. Plates 103 have similar downturned flanges 105 to form underflow weirs and these are provided with inturned toe or lip portions 107 to prevent counter-flow of oil against the descending phenol stream. The deflector plates 109 are substantially the same as members 69 of Fig. 2, and the upturned weirs 111 are the same as members 81, 83 of Fig. 2.

Instead of forming the opposite edge of the plates 103 with bent portions as in Fig. 2, an annular baffle member is formed or attached thereto in such a manner as to provide both an overflow and an underflow weir structure. The overflow weir is indicated at 113 and the underflow weir at 115. These parts correspond respectively to the upper and lower parts of the flange 65 of Fig. 2. Drain outlets and ports of escape for air are indicated at 117 in deflector 109, and at 119 in deflector 111, respectively.

Figure 5:
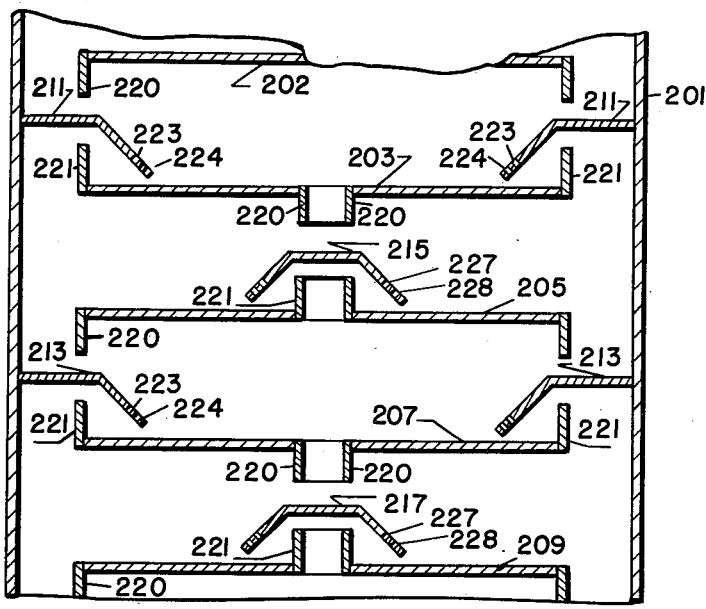
Fig. 5 shows diagrammatically another form of the invention.

In Fig. 5 there is shown an apparatus which operates essentially like that of Fig. 1, except that arrangements are made for double passage of the liquids. The vessel has sidewalls 201, preferably cylindrical, and is provided with transverse plates 202, 203, 205, 207, 209, etc., outer deflectors 211, 213, etc., and inner deflectors 215, 217, etc. The plates 203, 205, etc. have downturned flanges or underflow weirs 220 and upturned flanges or weir-forming portions 221 alternately arranged at their outer and inner margins, these being arranged to cooperate with the deflectors 211, 215, etc. Each plate 203 has an upturned flange 221 forming an overflow weir on each of its opposite sides beneath the deflector 211. The upper edge of each such weir is higher than the highest opening 223, 224, etc. in the sloping side portion of plate 211. At their central portions alternate plates, e. g. plate 203, has downturned flanges 220 to provide a downward passageway and an underflow weir. The phenol flows down through these passages against the top of deflectors 215 etc. The phenol then flows laterally and down the sloping sides of deflectors 215, 217, etc., where it contacts streamlets or jets of oil emerging upwardly through openings 227, 228 in these sloping sides. The oil passes up over outer weirs 221 and downwardly under deflectors 211, 213, etc. to the openings 223, etc., where it emerges to contact the descending phenol again, and the operation is repeated.

It will be understood that the apparatus of Fig. 5 is suitable for larger towers, especially towers of larger diameter or cross-section than that of Fig. 1 or 2. In extremely large apparatus it might be desirable to arrange for triple or other multiple flow and this can be done by providing suitable annular deflectors, etc. as will be obvious to those skilled in the art.

Figure 6:
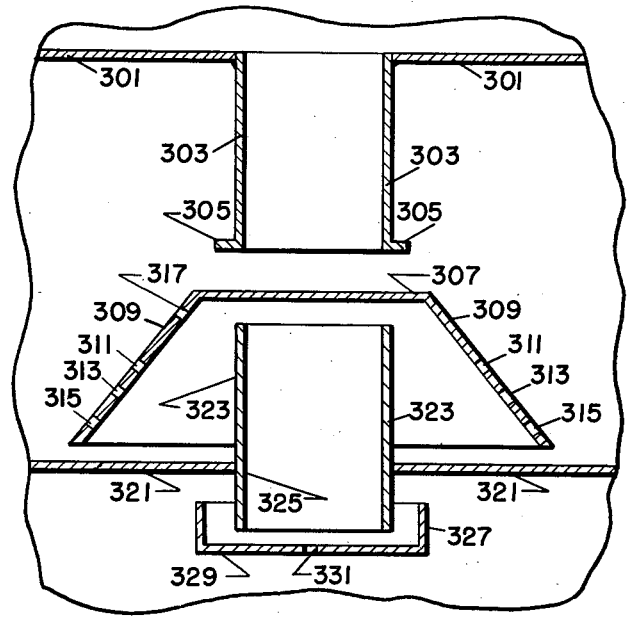
Fig. 6 is a detailed view of apparatus of the general type shown in Fig. 5 to which certain novel features have been added.

In Fig. 6 there is shown another modified double passage arrangement for overflow weirs and deflectors comparable to the arrangements of Figures 2 and 3. Except for the double passage, this tower is quite similar. Hence, the purpose and operation of this structure will be evident to those skilled in the art.

Briefly, a first transverse plate 301 is provided with a downturned centrally located flange 303 which forms an underflow weir for the descending phenol or other dense liquid. This weir preferably terminates in an outwardly directed toe portion or lip 305 for the purpose described above in connection with elements 61 and 107 in Figures 2 and 3. The descending phenol strikes the relatively horizontal top of a deflector 307 which has sloping side-wall portions 309, said walls being provided with a series of perforations 311, 313, 315, etc. One or more small outlets are provided to release entrapped air where needed as indicated at 317, the openings being of such size as not to materially affect the flow of the liquids being processed, as previously explained.

Beneath the deflector or flow controller 307, the next or alternate plate 321 is provided with a centrally located flange which forms both an overflow weir 323 and an underflow weir 325. The purpose of this construction is the same as that described at 113 and 115, Fig. 3. An additional deflector or overflow weir is provided below the underflow weir 325 as indicated at 327. The member may be of cup or dish shape having a horizontal bottom 329 and provided with a similar drain opening 331. It serves the same purpose as elements 81 and 111 of Figures 2 and 3, i. e., it prevents counterflow of the other liquid.

Figure 7:
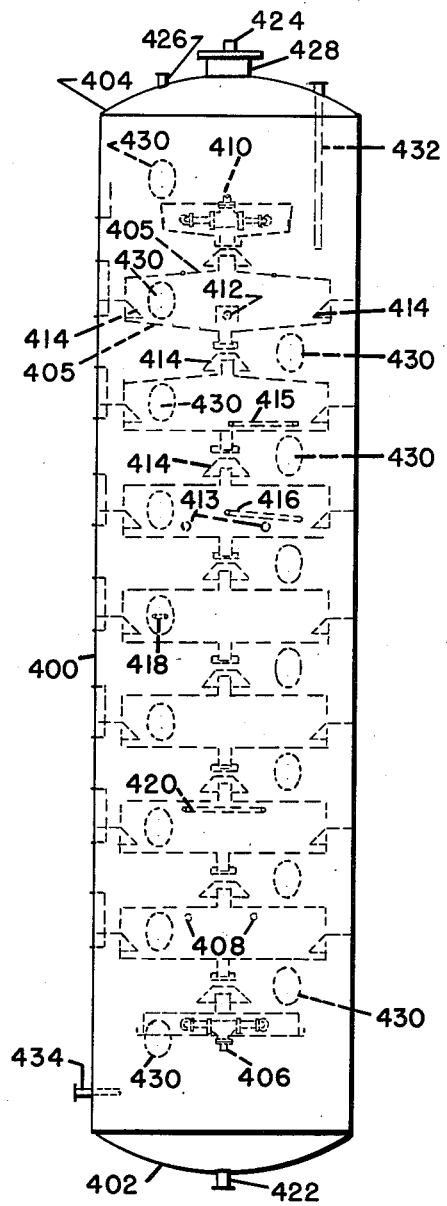
Fig. 7 is a vertical elevational view in section of a tower embodying the invention.

In Fig. 7 there is shown in full height a tower made according to the principles of the invention. This tower comprises a vertical cylindrical vessel 400 having a convex bottom 402 and a convex top closure 404. This tower is shown as equipped with sixteen trays 405 or stages of the double pass type. The number of stages, of course, may be varied. The lighter liquid, for example mineral lubricating oil, is introduced at or near the bottom, at 406. Additional inlets may be provided at a somewhat higher level as indicated at 408. Near the top the heavier liquid may be introduced as at 410, with an additional inlet being provided at 412, somewhat lower. Further inlets may be provided still lower at 413. These additional inlets are optional, though they are sometimes useful to improve dispersion. Sloping perforated baffle plates are shown at 414.

In extracting lubricating oils with phenol, a phenol-water spray is often useful, as is well known in the art. Such sprays are indicated at 415, 416, 418 and 420. The use of about 1 to 3% of water, preferably 1½ to 2½% based on the phenol, aids oil extraction.

The vessel 400 is provided with a spent phenol exit 422 at the bottom and an oil outlet 424 at the top. An air vent 426 is provided at the top, which can be opened upon initial filling of the tower and closed during operation. Outlet 424 and vent 426 are, of course, interchangeable but one of them, e. g. outlet 424, is preferably mounted in a large access opening or manhead cover 428, as shown. Additional manheads or access openings are provided at each level or at other suitable intervals as indicated at 430. A suitable interface level indication device 432 is located at or near the top and a perforated electrode 434 is inserted near the bottom. The latter is used to measure conductivity in the spent phenol to indicate its quality and concentration.

The apparatus of Fig. 7 embodies most of the details of the plates and associated parts described again and it is believed that its operation will be entirely clear without further description. Obviously various modifications may be made within the scope of the invention, as will be apparent to those skilled in the art.

What is claimed is:

1. A liquid-liquid contacting apparatus comprising a vessel, a series of vertically spaced transverse plates within said vessel, each of said plates having a relatively horizontal portion extending over a larger portion of the transverse area of said vessel, each of said plates being provided with an upturned overflow weir at one margin and a downturned underflow weir at another margin, the upturned weirs of successive plates being substantially laterally opposite one another a deflector plate extending over each overflow weir from the wall of said vessel and sloping downwardly to a point inward of and below the level of said overflow weir, and the sloping portion being perforate interiorly of and below the top of the associated overflow weir.

2. A liquid-liquid contacting apparatus comprising a tower vessel, a series of transverse substantially horizontal plates dividing said vessel into a series of superimposed contact zones, each of said plates comprising an overflow weir on one margin over which a relatively light fluid is adapted to pass and an underflow weir on an opposite margin under which a heavier liquid is adapted to flow by gravity, the underflow weirs of successive plates being laterally opposite one another and a perforate sloping deflector member extending from the wall of said vessel under each underflow weir and over each overflow weir, the arrangement being such that the heavy liquid passing the underflow weir flows down the upper sloping surface of the deflector and the lighter liquid from the overflow weir flows downwardly beneath said sloping surface until it emerges through perforations therein in small streamlets cross-current to the downflowing heavy liquid, the perforate portion of each deflector member being spaced laterally inward from its respective overflow weir and vertically intermediate the vertical extremities of its respective overflow weir.

3. Apparatus according to claim 2 wherein the underflow weir for the heavy liquid is provided with a lip turned in the direction of heavy liquid flow to impede counterflow of light liquid.

4. In combination, a vertical tower, a series of transverse plates dividing said tower into a series of liquid-liquid contacting zones in each of which a heavy downflowing liquid makes intimate contact with a lighter upflowing liquid, an overflow weir for the lighter liquid on one marginal portion and an underflow weir for the heavier liquid on a relatively opposed marginal portion of each plate, successive plates being oriented laterally opposite one another and a deflector element comprising a relatively horizontal portion sealed to the wall of said tower and interposed between the underflow weir of one plate and the overflow weir of the adjacent plate, said deflector having a perforate sloping portion adapted to carry the heavy liquid down on its upper surface and to carry the light liquid downwardly on its under surface, the sloping portion having a plurality of perforations all below the level of the associated overflow weir and spaced laterally inward of said associated weir and adapted to jet the lighter liquid upwardly in cross-current flow to the sloping downflowing current of heavy liquid.

5. Combination according to claim 4 in which the perforate portion slopes at an angle of 20 to 75°.

6. Combination according to claim 4 in which the perforate portion slopes at about 45°.

7. An apparatus for countercurrently contacting two incompletely miscible liquids having different densities wherein one of the liquids constitutes a continuous liquid phase within the apparatus and the other liquid constitutes a discontinuous phase which comprises a vessel adapted to contain liquids, conduit means to introduce the heavier liquid and the lighter liquid within the top and bottom respectively of the vessel and to withdraw the heavier liquid and the lighter liquid from the bottom and the top respectively of the vessel, a plurality of substantially horizontal, vertically spaced plates extending laterally throughout said vessel and dividing the vessel into a plurality of settling zones adapted to separate mixtures of said liquids, each of said plates turned over at one margin to form a first lip member extending from its respective plate toward the end of the vessel where the discontinuous phase liquid enters the vessel, a second lip member at the laterally opposite margin of each plate extending from the plate toward the end of the vessel where the continuous phase liquid enters the vessel, the first lip members of successive plates being laterally opposite from one another, a separate deflector plate sealed to the wall of said vessel and interposed between the first lip member of each plate and the second lip member of the next adjacent plate, at least a portion of each said deflector plate sloping toward the discontinuous phase liquid entrance to the vessel, the sloping portion of each deflector plate being provided with a plurality of perforations, which are spaced laterally inward of its adjacent said first and second lip members and vertically intermediate the vertical extremities of the second lip member.

8. An apparatus for countercurrently contacting two incompletely miscible liquids having different densities which comprises a vertically disposed vessel adapted to contain liquids, a plurality of horizontally disposed, vertically spaced, imperforate plates extending laterally over a major portion of the transverse area of said vessel, one margin of each plate turned toward one end of said vessel to form a first lip, and a laterally opposite margin turned toward the other end of said vessel to form a second lip, the first lips of adjacent plates being substantially laterally opposite one another within said vessel, a deflector plate sealed to the inner wall surface of said vessel and extending centrally of said vessel in vertical spaced relation with each said first lip, a portion of each deflector plate being perforated, the perforate portion lying vertically intermediate the vertical limits of its respective first lip and laterally inward of its respective first and second lips, and conduit means for supplying the two liquids to the vessel and for subsequently withdrawing the liquids from the vessel.

9. An apparatus as defined in claim 8 in which the unattached vertical extremity of each second lip is sealed to a horizontally disposed toe member extending centrally of said vessel.

10. Apparatus according to claim 2 wherein there is attached to the wall of said vessel a trough element, and wherein said over-flow weir has attached at the end thereof a downwardly extending member, the bottom edge of which is below the lip of said trough element.

References Cited in the file of this patent

UNITED STATES PATENTS

| | | |
|---|---|---|
| 1,651,354 | Alexander | Dec. 6, 1927 |
| 2,215,359 | Livingston et al. | Sept. 17, 1940 |
| 2,216,933 | Atkins | Oct. 8, 1940 |
| 2,271,462 | Pfennig | Jan. 27, 1942 |
| 2,451,433 | Davis | Oct. 12, 1948 |
| 2,497,136 | Patterson | Feb. 14, 1950 |
| 2,501,114 | Whaley | Mar. 21, 1950 |
| 2,610,046 | Collins | Sept. 9, 1952 |
| 2,614,031 | Tickler | Oct. 14, 1952 |
| 2,642,341 | Bradley | June 16, 1953 |